(12) United States Patent
Tomizuka et al.

(10) Patent No.: US 7,679,691 B2
(45) Date of Patent: Mar. 16, 2010

(54) DISPLAY DEVICE

(75) Inventors: Yoshiteru Tomizuka, Mobara (JP); Kentaro Oku, Mobara (JP); Yoshinori Tanaka, Mobara (JP); Yoshiharu Nagae, Hitachi (JP)

(73) Assignee: Hitachi Displays, Ltd. (JP)

( * ) Notice: Subject to any disclaimer, the term of this patent is extended or adjusted under 35 U.S.C. 154(b) by 214 days.

(21) Appl. No.: 12/022,198

(22) Filed: Jan. 30, 2008

(65) Prior Publication Data

US 2008/0180587 A1 Jul. 31, 2008

(30) Foreign Application Priority Data

Jan. 31, 2007 (JP) ............... 2007-021522

(51) Int. Cl.
*G02F 1/1335* (2006.01)
(52) U.S. Cl. ........................ 349/15; 349/95
(58) Field of Classification Search ............... None
See application file for complete search history.

(56) References Cited

U.S. PATENT DOCUMENTS

| 6,906,762 | B1 | 6/2005 | Witehira et al. | |
| 7,394,506 | B2 * | 7/2008 | Cirkel et al. | 349/15 |
| 2006/0125977 | A1 * | 6/2006 | Park et al. | 349/95 |

FOREIGN PATENT DOCUMENTS

JP        2001-054144        2/2001

\* cited by examiner

*Primary Examiner*—Tina M Wong
(74) *Attorney, Agent, or Firm*—Antonelli, Terry, Stout & Kraus, LLP.

(57) ABSTRACT

The present invention prevents a moiré generated by the interference of two liquid crystal display panels in a display device capable of performing a three-dimensional display using two liquid crystal display panels. By arranging an upper lens array and a lower lens array between an upper liquid crystal display panel and a lower liquid crystal display panel, a moiré and smearing of an image can be prevented. Due to such a constitution, lowering of brightness and contrast can be suppressed.

20 Claims, 14 Drawing Sheets

I-I

II-II

DISPLAY DEVICE

CROSS-REFERENCE TO RELATED APPLICATION

The present application claims priority from Japanese application JP2007-021522 filed on Jan. 30, 2007, the content of which is hereby incorporated by reference into this application

BACKGROUND OF THE INVENTION

1. Field of the Invention

The present invention relates to a display device, and more particularly to a device which acquires a three-dimensional image using two liquid crystal panels.

2. Description of the Related Art

As one of methods for displaying a three-dimensional image, there has been known a technique in which two transmissive display panels are arranged with a distance therebetween, similar images are formed on two transmissive display panels, and a depth feeling is generated by controlling brightnesses of two images thus forming a three-dimensional image. As a document which discloses such a method, "patent document 1 (JP-A-2001-54144)" may be named. A typical example of the transmissive display device is a liquid crystal display panel.

In the liquid crystal display panel, a large number of scanning lines and a large number of video signal lines are arranged in an intersecting manner. Further, pixels are formed at portions surrounded by the scanning lines and the video signal lines. Accordingly, to look at a screen in a microscopic manner, bright portions and dark portions are regularly generated. When images are formed by overlapping two liquid crystal display panels with a distance therebetween, the dark portions and the bright portions formed regularly on the respective liquid crystal display panels generate interference thus causing a so-called moiré. To cope with the moiré generated in the above-mentioned constitution, a technique which arranges a layer for diffusing light between two liquid crystal panels is described in "patent document 2 (Japanese Patent 3335998 (corresponding to U.S. Pat. No. 6,906,762))".

SUMMARY OF THE INVENTION

By arranging the diffusion layer between two liquid crystal display panels as described in patent document 2, the moiré can be reduced. However, as byproducts, there arise lowering of front-face brightness, lowering of contrast, smearing of an image (blurring of a profile of an image) or the like.

Accordingly, it is an object of the present invention to provide a display device which, in a method for acquiring a three-dimensional image by arranging two liquid crystal display panels with a distance therebetween and by controlling an image signal to two liquid crystal panels, can prevent byproducts such as lowering of front-face brightness, lowering of contrast or smearing of an image while reducing the above-mentioned moiré.

The present invention can suppress moiré and smearing of an image by, in a method for acquiring a three-dimensional image by arranging two liquid crystal display panels with a distance therebetween and by controlling an image signal to two liquid crystal display panels, arranging two lens arrays between two liquid crystal display panels. Specific constitutions are as follows.

(1) According to a first aspect of the present invention, there is provided a display device comprising a first liquid crystal display panel, a second liquid crystal display panel arranged behind the first liquid crystal display panel with a predetermined distance therebetween, and a backlight arranged behind the second liquid crystal display panel, the display device being configured to allow an image to be viewable from a front side of the first liquid crystal display panel, wherein between the first liquid crystal display panel and the second liquid crystal display panel, a first lens array for focusing light more strongly in a direction orthogonal to a specific direction (first direction) than the specific direction, and a second lens array for focusing light more strongly in a direction orthogonal to a direction (second direction) different from the specific direction are arranged.

(2) In the display device having the constitution (1), the first lens array is a lens array which does not focus light in the specific direction, and the second lens array is a lens array which does not focus light in the direction different from the specific direction.

(3) In the display device having the constitution (1), the specific direction and the direction different from the specific direction make angles with respect to a long side of the first liquid crystal display panel or a long side of the second liquid crystal display panel.

(4) In the display device having the constitution (1), the specific direction and the direction different from the specific direction make angles ranging from 40 degrees to 75 degrees with respect to a long side of the first liquid crystal display panel or a long side of the second liquid crystal display panel.

(5) In the display device having the constitution (1), the specific direction and the direction different from the specific direction make angles ranging from 55 degrees to 75 degrees with respect to a long side of the first liquid crystal display panel or a long side of the second liquid crystal display panel.

(6) In the display device having the constitution (1), the first lens array or the second lens array is arranged to be in contact with the second liquid crystal display panel.

(7) In the display device having the constitution (1), the first lens array or the second lens array is formed of lenticular lenses.

(8) In the display device having the constitution (1), across-section of the lenticular lens has a valley formed between the respective lenses formed in a curved shape.

(9) In the display device having the constitution (1), a lens cross section of the first lens array or the second lens array is formed in a corrugated shape.

(10) In the display device having the constitution (1), a lens cross section of the first lens array or the second lens array is formed in a triangular shape with a peak angle set to a value larger than 90 degrees.

(11) In the display device having the constitution (1), a lens cross section of the first lens array or the second lens array is formed in a trapezoidal shape.

(12) In the display device having the constitution (1), a lens cross section of the first lens array or the second lens array is formed in a pentagonal shape with distal ends thereof formed into peaks.

(13) In the display device having the constitution (1), the relationship between a pitch P and a height H of lenses of the first lens array or the second lens array is set to satisfy $H/P \leq 1/10$.

(14) In the display device having the constitution (1), the relationship between a pitch P and a height H of lenses of the first lens array or the second lens array is set to satisfy $H/P \leq 1/7$.

(15) According to a second aspect of the present invention, there is provided a display device comprising a first liquid crystal display panel, a second liquid crystal display panel arranged behind the first liquid crystal display panel with a predetermined distance therebetween, and a backlight arranged behind the second liquid crystal display panel, the display device being configured to allow an image to be viewable from a front side of the first liquid crystal display panel, wherein between the first liquid crystal display panel and the second liquid crystal display panel, a first lens array sheet for focusing light more strongly in a direction orthogonal to a specific direction (first direction) than the specific direction, and a second lens array sheet for focusing light more strongly in a direction orthogonal to a direction (second direction) different from the specific direction are arranged.

(16) According to a third aspect of the present invention, there is provided a display device comprising a first liquid crystal display panel, a second liquid crystal display panel arranged behind the first liquid crystal display panel with a predetermined distance therebetween, and a backlight arranged behind the second liquid crystal display panel, the display device being configured to allow an image to be viewable from a front side of the first liquid crystal display panel, wherein a lens array sheet is arranged between the first liquid crystal display panel and the second liquid crystal display panel, a first lens array for focusing light more strongly in a direction orthogonal to a specific direction (first direction) than the specific direction is formed on a first surface of the lens array sheet, and a second lens array for focusing light more strongly in a direction orthogonal to a direction (second direction) different from the specific direction is formed on a second surface of the lens array sheet.

(17) According to a fourth aspect of the present invention, there is provided a display device comprising a first liquid crystal display panel, a second liquid crystal display panel arranged behind the first liquid crystal display panel with a predetermined distance therebetween, and a backlight arranged behind the second liquid crystal display panel, the display device being configured to allow an image to be viewable from a front side of the first liquid crystal display panel, wherein a lens array sheet is arranged between the first liquid crystal display panel and the second liquid crystal display panel, and a micro lens array having periodicity in a first direction and a second direction different from the first direction is formed on a surface of the lens array sheet.

(18) In the display device having the constitution (17), the other surface of the lens array sheet is a planar surface.

(19) In the display device having the constitution (17), a pitch in the first direction and a pitch in the second direction of the micro lens array are equal to each other.

(20) In the display device having the constitution (17), the first direction and the second direction are arranged in line symmetry with respect to a short axis of the lens sheet.

By arranging the lens array between two liquid crystal display panels, a moiré induced by two liquid crystal display panels can be eliminated. With the use of the lens array, compared to a case in which a moiré is eliminated using a diffusion sheet or the like, it is possible to prevent lowering of front-face brightness and contrast. Further, with the use of two lens arrays, this advantageous effect can be enhanced.

Although two lens arrays may be formed in two sheets, in forming two lens arrays in one sheet, two lens arrays may be formed on a front face and a back face of the lens sheet thus reducing the number of parts and a setting error of the lens array.

The advantageous effect acquired by two lenses can be also acquired by the micro lens array formed on only one surface of the lens sheet. In this case, it is sufficient to use only one sheet of lens formed on only one surface of the lens sheet and hence, it is possible to acquire advantageous effects such as the reduction of number of parts and the reduction of cost.

DESCRIPTION OF THE PREFERRED EMBODIMENTS

The present invention is explained in detail hereinafter in conjunction with embodiments.

Embodiment 1

Figure 1:
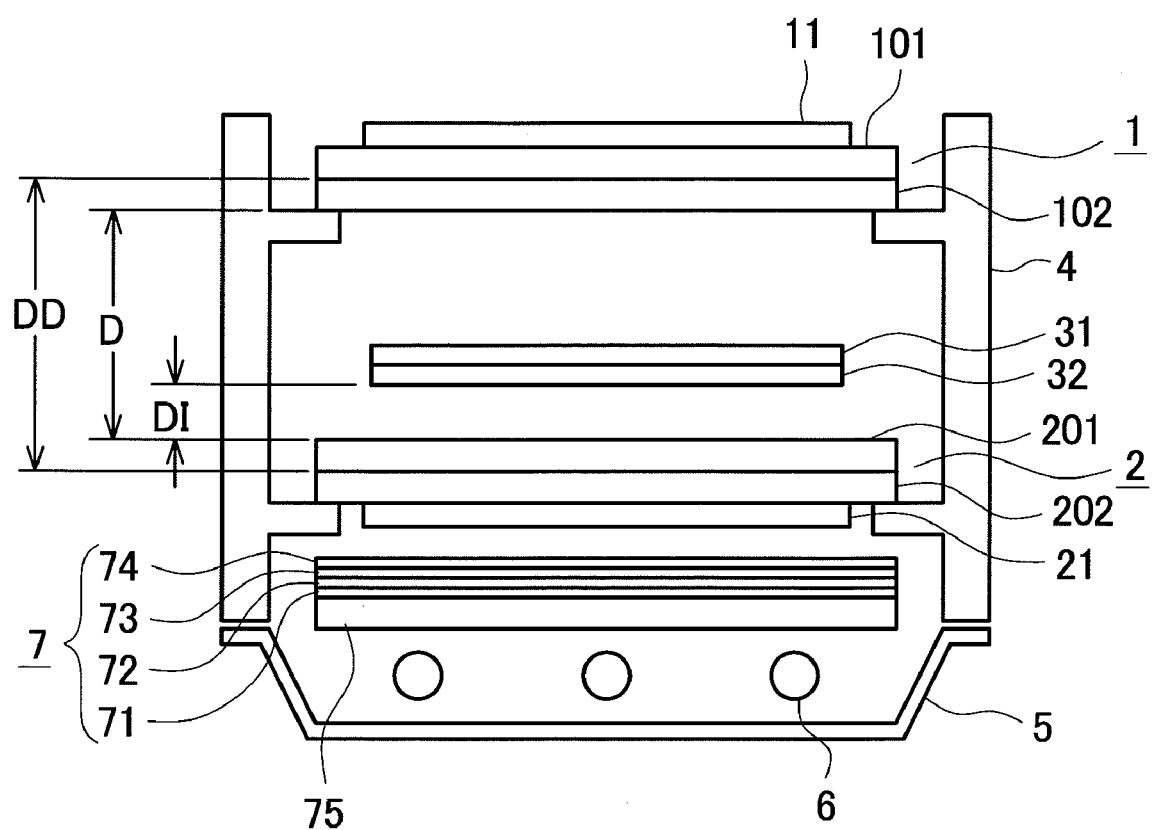
FIG. 1 is a schematic cross-sectional view of a three-dimensional display device according to an embodiment 1 of the present invention.

FIG. 1 is a schematic cross-sectional view of a three-dimensional display device according to the present invention. In FIG. 1, image signals are supplied to an upper liquid crystal display panel 1 and a lower liquid crystal display panel 2 thus forming images respectively. Although the images formed on the upper liquid crystal display panel 1 and the lower liquid crystal display panel 2 are relevant to each other, by adding information on the depth direction to the respective images, when a human watches the two-dimensional images on the respective panels, a three-dimensional image appears in a pseudo manner. To be more specific, by differentiating the brightness of the image formed on the upper liquid crystal display panel 1 and the brightness of the image formed on the lower liquid crystal display panel 2 from each other depending on the information signals in the depth direction, a depth feeling is generated.

Figure 5:
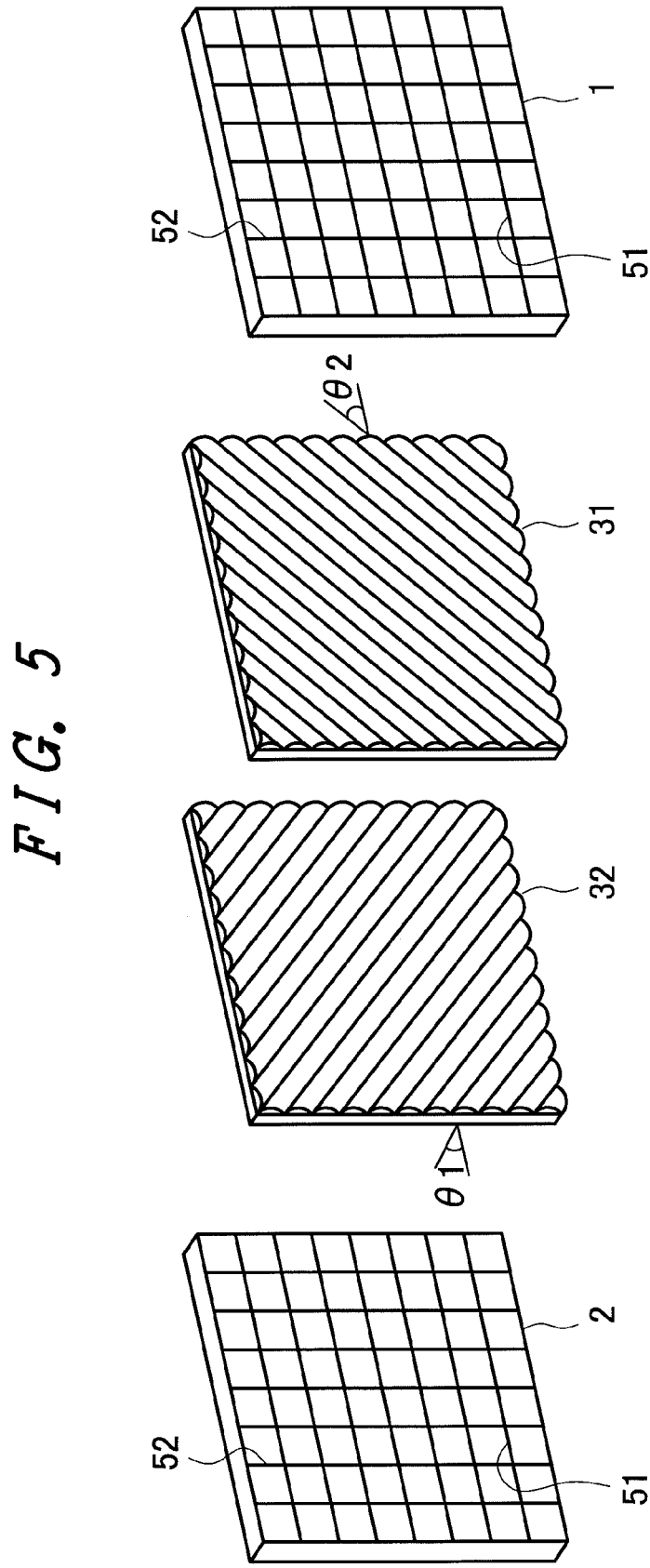
FIG. 5 is an arrangement view of a liquid crystal display panel and a lens array.

Sizes of effective screens of the liquid crystal display panels of this embodiment are 9 inches in diagonal length. The upper liquid crystal display panel 1 is, in general, formed of upper and lower substrates 101, 102 made of glass and liquid crystal sandwiched between the upper and lower substrates 101, 102. On the lower substrate 102, as shown in FIG. 5, a large number of scanning lines 51 and a large number of video signal lines 52 extending in the direction orthogonal to the scanning lines 51 are formed. Pixels are formed in portions surrounded by the scanning lines 51 and the video signal lines 52. Further, optical transmissivity of liquid crystal is changed in response to image signals applied to pixel portions thus forming an image.

Figure 6:
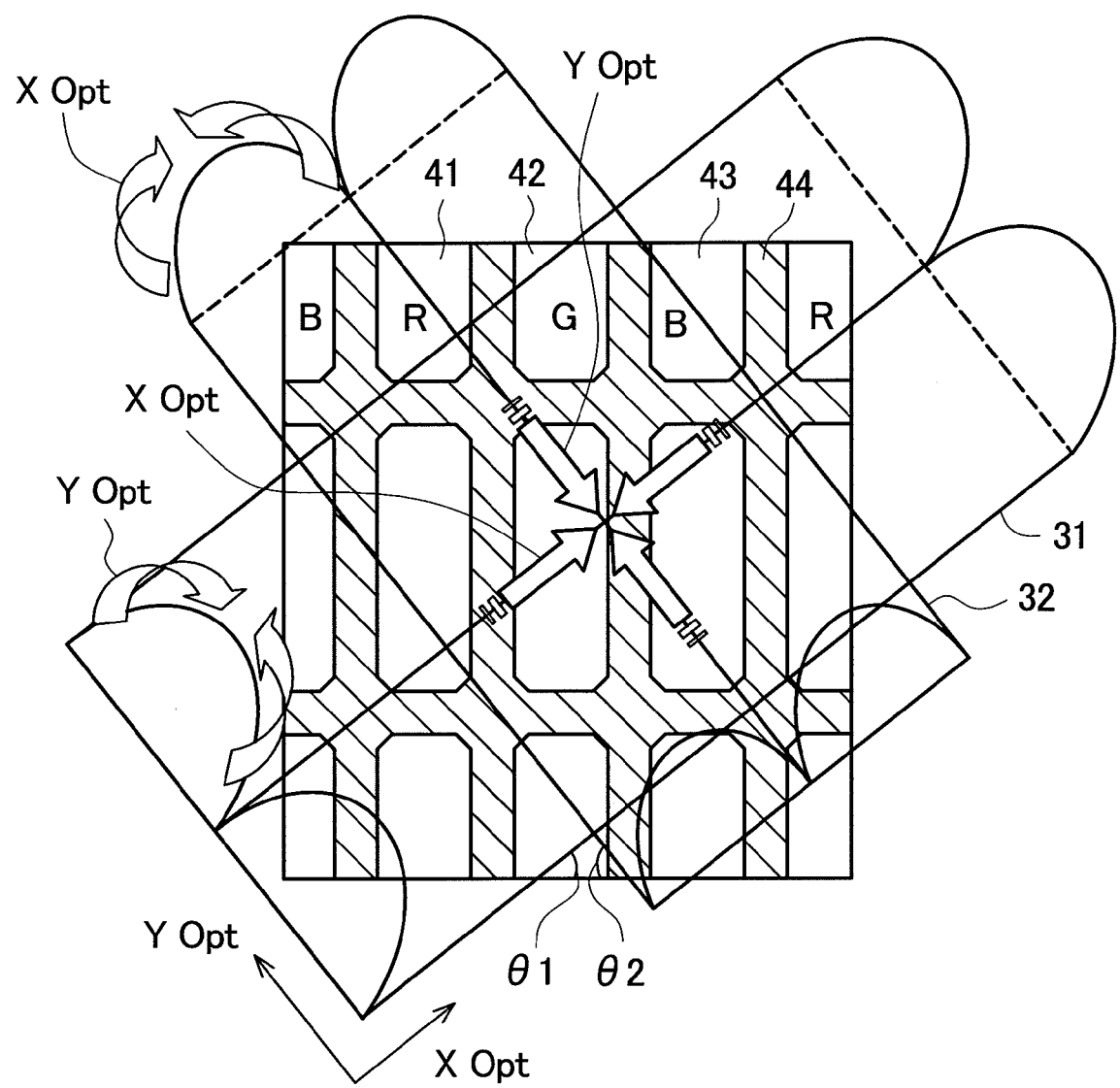
FIG. 6 is a plan view showing the relationship between a color filter surface and a lenticular lens.

On the upper substrate 101, as shown in FIG. 6, corresponding to the pixel portions formed on the lower substrate 102, color filters of three colors consisting of red, green and blue are formed thus providing a color image. A black matrix 44 for enhancing contrast is formed between the color filters. The black matrix 44 is configured to cover the scanning lines 51 and the video signal lines 52 formed on the lower substrate 102. The lower liquid crystal display panel 2 is also formed of a lower substrate 202, an upper substrate 201 and liquid crystal sandwiched between these substrates 201, 202 and has the substantially equal basic constitution as the upper liquid crystal display panel 1.

While the liquid crystal forms an image by modulating light from a backlight, it is necessary to polarize the light modulated by the liquid crystal. Accordingly, a lower polarizer 21 is arranged below the lower liquid crystal display panel 2 so as to polarize light from the backlight. Light emitted from the lower liquid crystal display panel 2 is incident on the upper liquid crystal display panel 1 through a lens array 3 described later and is subject to modulation in the upper liquid crystal display panel 1. To take out only light subject to the modulation in the lower liquid crystal display panel 2 and the upper liquid crystal display panel 1 and served for forming an image, an upper polarizer 11 is formed. The upper liquid crystal display panel 1, the lower liquid crystal display panel 2, an upper lens array 31, a lower lens array 32 and accessories of these members are housed in the inside of a side frame 4. In case of a liquid crystal display screen of 9 inches, a distance DD between liquid crystal layers of two liquid crystal display panels is 7.5 mm, for example. Respective thicknesses of the substrates of the liquid crystal display panel are 0.6 mm, and a distance D between the upper liquid crystal display panel 1 and the lower liquid crystal display panel 2 is 6.3 mm. Respective thicknesses of the upper lens array 31 and the lower lens array 32 are 0.3 mm and these lens arrays are formed in a sheet shape. The thicknesses of the upper lens array 31 and the lower lens array 32 are not limited to 0.3 mm and may be 0.5 mm, for example. In FIG. 1, although the lower lens array 32 is arranged at a position away from the lower liquid crystal display panel 2 by the distance D1, the lower lens array 32 may be arranged at any position between the upper liquid crystal display panel 1 and the lower liquid crystal display panel 2 when necessary. An image of the liquid crystal display panel closer to the lens array 3 is influenced by the lens array 3. According to an experiment, when the distance D1 is set to zero, that is, when the lower lens array 32 is arranged on the lower liquid crystal display panel 2, an optimum result is acquired.

Since the liquid crystal display panel per se does not emit light, the backlight is necessary. In FIG. 1, fluorescent lamps 6 are arranged in the inside of the lower frame 5 as a light source. In this display method, two liquid crystal display panels are used. Optical transmissivities of the respective liquid crystal display panels are not more than 10%. Accordingly, the optical transmissivity of two liquid crystal display panels become not more than 1%. Accordingly, the backlight used in this display method is required to possess large brightness. Although 3 pieces of fluorescent lamps 6 are arranged as the light source in FIG. 1, to acquire the sufficient brightness, even when the size of the screen is 9 inches, approximately 9 pieces of fluorescent lamps 6 may become necessary.

An inner side of the lower frame 5 forms a light reflection surface. To collect light on a main surface side of the liquid crystal panel as much as possible, an optical sheet group 7 is formed over the fluorescent lamps 6 which constitute the light source. In FIG. 1, the optical sheet group 7 is constituted of a lower diffusion sheet 71, a lower prism sheet 72, an upper prism sheet 73, and an upper diffusion sheet 74. All of these optical sheet groups 7 are not always necessary and these sheets may be arranged depending on usage of the liquid crystal display device by taking brightness required by the screen, image quality, cost and the like into consideration.

A diffusion plate 75 is arranged below the optical sheet group 7. The diffusion plate 75 plays a role of diffusing light from the fluorescent lamps 6 which constitute the light source so as to make the light uniform and, at the same time, a role of supporting the optical sheet group 7. The diffusion plate 75 is made of polycarbonate, has a plate thickness of 2 mm, and possesses optical transmissivity of approximately 70%. As the diffusion plate 75, for example, PCDSD471G made by Takiron Co., Ltd. is used.

Figure 2:
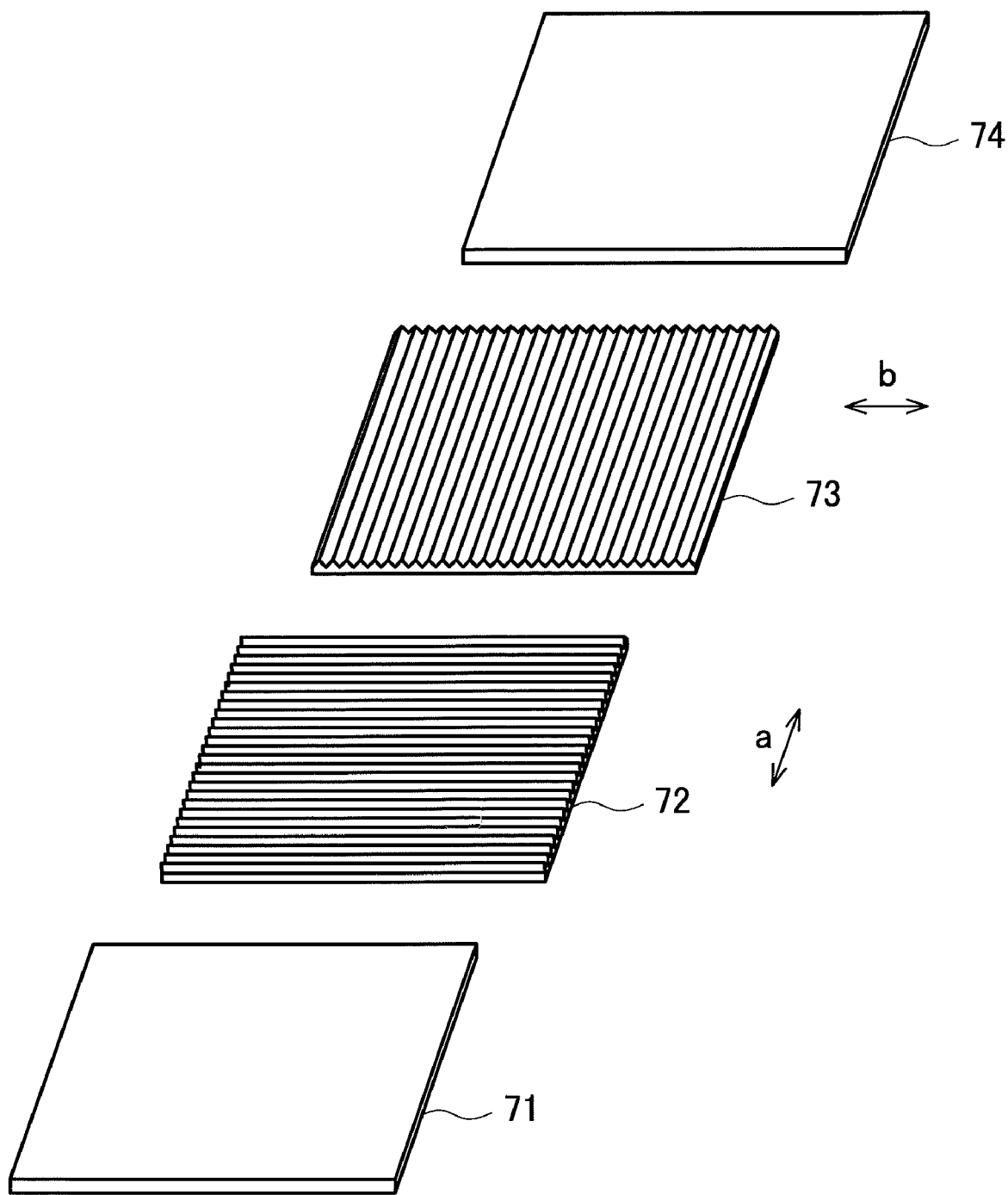
FIG. 2 is a perspective view of an optical sheet of a backlight.
Figure 3:
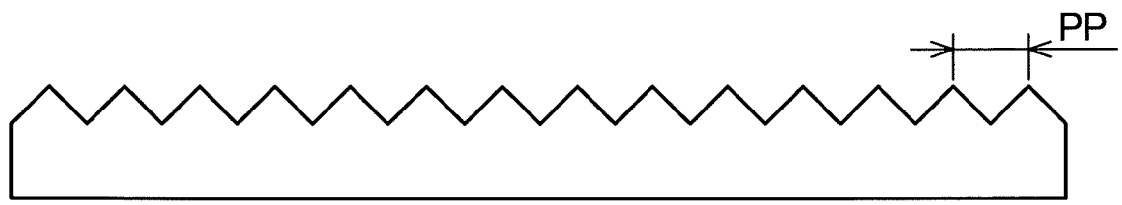
FIG. 3 is a cross-sectional view of a prism sheet.

FIG. 2 is an exploded perspective view of the optical sheet group 7 shown in FIG. 1. Since the light source is formed of the fluorescent lamps 6, only portions of the optical sheet group 7 where the respective fluorescent lamps 6 are positioned are made bright thus making the light from the backlight non-uniform. The lower diffusion sheet 71 is provided for preventing such non-uniformity of light from the backlight. As the lower diffusion sheet 71, for example, D124 (product name) made by TSUJIDEN Co., Ltd. is used. The lower prism sheet 72 is formed on the lower diffusion sheet 71. FIG. 3 shows a cross section of the lower prism sheet 72 and a large number of prisms are formed on the lower prism sheet 72. A pitch of the prisms is set to 50 μm, for example. The lower prism sheet 72 has a role of focusing light from the backlight which tends to spread in the direction "a" shown in FIG. 2 in the direction toward the liquid crystal panel. As the lower prism sheet 72, for example, BEFIII90/50-T(H) made by 3M is used.

The upper prism sheet 73 is formed on the lower prism sheet 72. FIG. 3 shows a cross section of the upper prism sheet 73. In the same manner as the lower prism sheet 72, a pitch of prisms is 50 μm, for example. The upper prism sheet 73 has a role of focusing light from the backlight which tends to spread in the direction "b" shown in FIG. 2 in the direction toward the liquid crystal panel. As the upper prism sheet 73, for example, BEFIII90/50-T(V) made by 3M is used. The upper diffusion sheet 74 is formed on the upper prism sheet 73. The upper diffusion sheet 74 is provided for making the light emitted from the prism sheet more uniform. D117VG (product name) made by TSUJIDEN Co., Ltd., for example, is used for the upper diffusion sheet 74.

Figure 4:
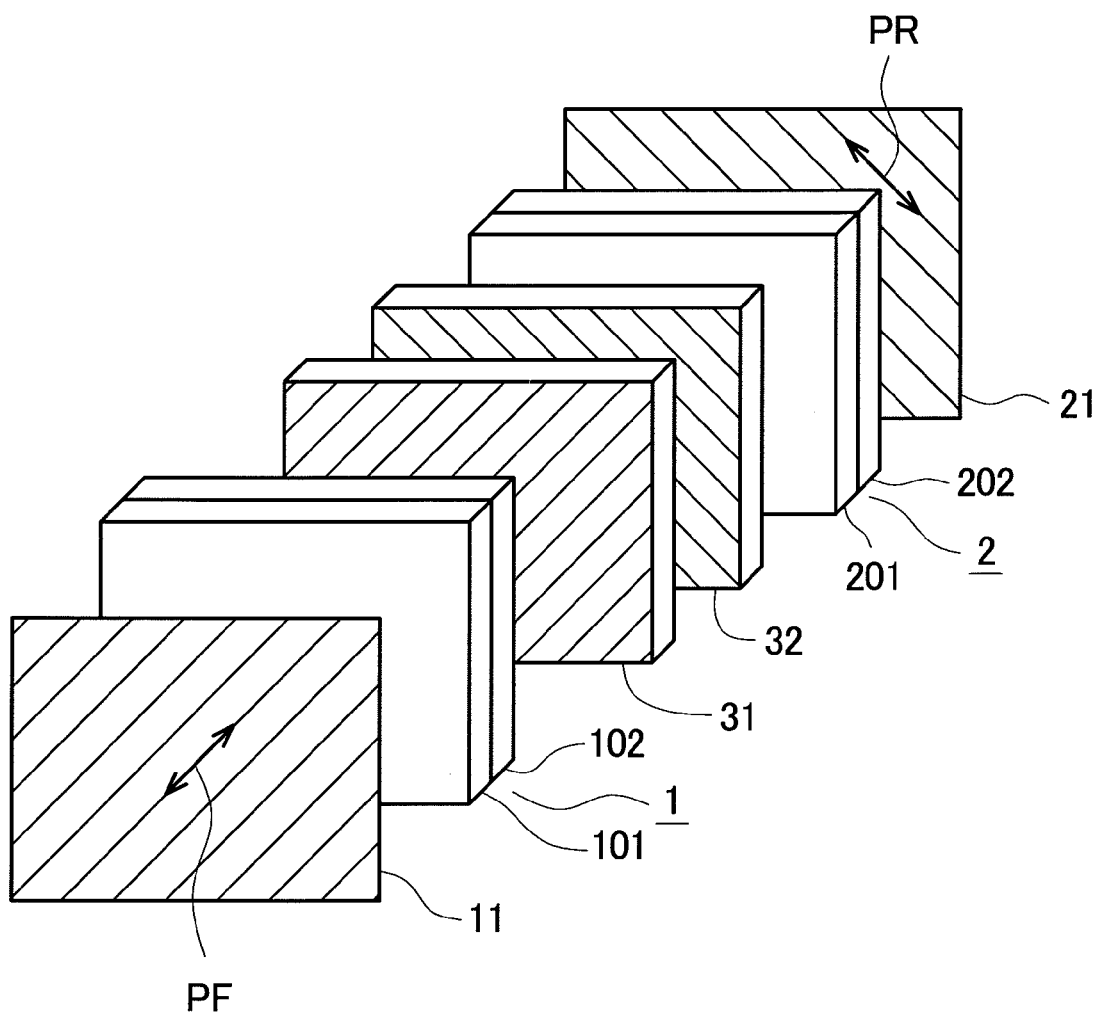
FIG. 4 is an exploded perspective view of an image forming part.

FIG. 4 is an exploded perspective view showing an essential part of this embodiment. The upper polarizer 11 is formed on the upper liquid crystal display panel 1, while the lower polarizer 21 is formed on the lower liquid crystal display panel 2. The upper lens array 31 and the lower lens array 32 are arranged between the upper liquid crystal display panel 1 and the lower liquid crystal display panel 2. As the upper lens array 31 and the lower lens array 32, a lens group such as a lenticular lens array which focuses light in the particular first direction but do not focus the light in the direction perpendicular to the first direction is used. Advantageous effects of the present invention can be acquired not only by the constitution which completely prevents focusing of light in the direction perpendicular to the first direction but also by the constitution in which a light focusing effect in the first direction is stronger than a light focusing effect in the direction perpendicular to the first direction. Although the upper lens array 31 and the lower lens array 32 differ from each other in the light focusing direction, the upper lens array 31 and the lower lens array 32 have properties substantially equal to each other.

In this embodiment, as shown in FIG. 4, the polarization direction PF of the polarizer arranged on the upper liquid crystal display panel 1 is set to 45 degrees in the clockwise direction. Further, the polarization direction PR of the polarizer arranged below the lower liquid crystal display panel 2 is set to 45 degrees in the counterclockwise direction. Light from the backlight is polarized by the lower polarizer 21 of the lower liquid crystal display panel 2, a polarizing surface of the polarized light is rotated by the lower liquid crystal display panel 2 and the upper liquid crystal display panel 1, and the polarized light is polarized by the upper polarizer 11 of the upper liquid crystal display panel 1 and is radiated to the outside. In this case, the polarized light which passes through the lower polarizer 21 is rotated by the lower liquid crystal display panel 2 with an angle of 90 degrees, and is further rotated by the upper liquid crystal display panel 1 with an angle of 90 degrees and hence, in a state that an image signal is not applied to the liquid crystal, the screen assumes a so-called normally-white mode where the screen becomes white. The upper lens array 31 and the lower lens array 32 are arranged between the upper liquid crystal display panel 1 and the lower liquid crystal display panel 2.

FIG. 5 shows the constitution shown in FIG. 4 in a further simplified manner. In FIG. 5, for the sake of brevity, only the scanning lines 51 and the video signal lines 52 are described in the upper liquid crystal display panel 1 and the lower liquid crystal display panel 2. The upper lens array 31 and the lower lens array 32 are arranged between the upper liquid crystal display panel 1 and the lower liquid crystal display panel 2. When neither the upper lens array 31 nor the lower lens array 32 are provided, the scanning lines 51 of the upper liquid crystal display panel 1 and the scanning lines 51 of the lower liquid crystal display panel 2 interfere with each other to generate a moiré, and the video signal lines 52 of the upper liquid crystal display panel 1 and the video signal lines 52 of the lower liquid crystal display panel 2 interfere with each other to generate a moiré. The present invention prevents the generation of moiré by arranging the upper lens array 31 and the lower lens array 32 having the light focusing directions different from each other between the upper liquid crystal display panel 1 and the lower liquid crystal display panel 2.

As a means for preventing the moiré, a diffusion sheet or a diffusion film used in a backlight may be arranged between the upper liquid crystal display panel 1 and the lower liquid crystal display panel 2. This method, however, diffuses light and hence, front-surface brightness, contrast and the like are lowered. The present invention prevents the moiré and, at the same time, prevents lowering of front-surface brightness and lowering of contrast by properly arranging the upper lens array 31 and the lower lens array 32. The upper lens array 31 and the lower lens array 32 are formed by arranging a large number of barrel-roof-shaped lenses extending in the fixed direction. The extending direction of the barrel-roof-shaped lenses and an angle made by the scanning lines 51 or the video signal lines 52 largely influence the moiré, brightness, contrast and the like. Hereinafter, the influence of this angle is evaluated, as shown in FIG. 5, by setting an angle made by the direction of scanning lines 51 and a ridge direction of the upper lens array 31 to θ1 and an angle made by the direction of scanning lines 51 and a ridge direction of the lower lens array 32 to θ2.

FIG. 6 is a view showing the relationship among the color filters, the black matrix, the upper lens array 31 and the lower lens array 32 formed on the upper substrate of the liquid crystal display panel. The color filters are arranged such that the red filter 41, the green filter 42 and the blue filter 43 are arranged in the lateral direction in order. A pitch between the respective filters is 82 μm and a pitch between the same filters is 246 μm. On the other hand, a longitudinal pitch of the color filters is 246 μm. Accordingly, when the color filters of three colors consisting of R, G, B are collected as a set, the longitudinal pitch and the lateral pitch become the same. The longitudinal pitch of the color filters corresponds to the pitch of the scanning lines 51 and the lateral pitch of the color filters corresponds to the pitch of the video signal lines 52.

In FIG. 6, for the sake of brevity, only two lenses consisting of the upper lens array 31 and the lower lens array 32 are described for showing the relationship between these lens arrays and the color filters. Although the upper lens array 31 is formed of a lenticular lens, the upper lens array 31 focuses light in the direction of Yopt in FIG. 6 but does not focus light in the direction of Xopt. An angle made by the extending direction of lenses of the upper lens array 31 and the lateral arrangement direction of the color filters is θ1. Although the lower lens array 32 is also constituted of lenticular lenses, these lenses focus light in the direction Xopt in FIG. 6 but do not focus light in the direction Yopt in FIG. 6. An angle made by the extending direction of lenses of the lower lens array 32 and the lateral arrangement direction of the color filters is θ2.

Figure 7A:
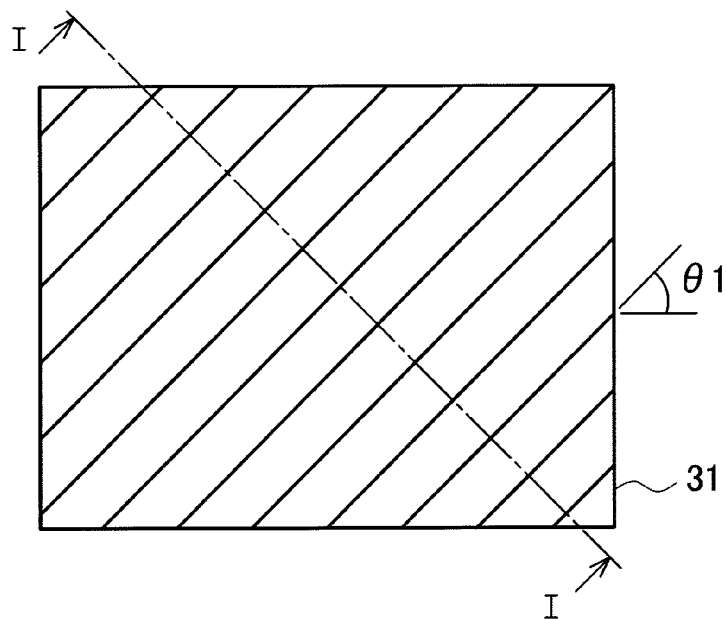
FIG. 7A is a plan view of an upper lens array.
Figure 7B:
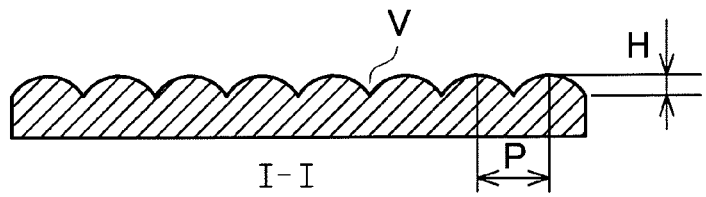
FIG. 7B is a cross-sectional view of lenticular lenses.
Figure 7C:
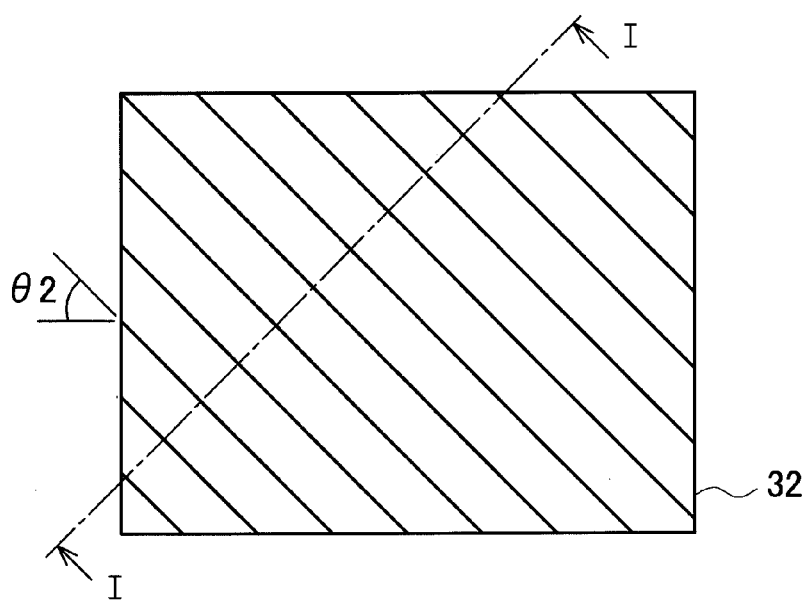
FIG. 7C is a plan view of a lower lens array.

FIG. 7A, FIG. 7B and FIG. 7C are specific examples of the upper lens array 31 and the lower lens array 32. FIG. 7A is a plan view of the upper lens array 31. A hatching in FIG. 7A indicates the direction of ridges of the lenticular lens. The direction of the ridges of the lenses makes an angle of θ1 with respect to a long side of the upper lens array 31. FIG. 7B is a cross-sectional view taken along a line I-I in FIG. 7A. In FIG. 7B, a height of lens is H and a pitch of the lenses is P. A valley V defined between the lenses may preferably be changed smoothly and gradually. FIG. 7C is a plan view of the lower lens array 32. A hatching in FIG. 7C indicates ridges of the lenticular lens. The direction of the ridges of the lenses of the lower lens array 32 assumes line symmetry with the direction of ridges of the lenses of the upper lens array 31 with respect to a short axis. That is, the relationship of θ1=θ2 is established. Further, a pitch of lenses of the upper lens array 31 and a pitch of lenses of the lower lens array 32 are set equal to each other. A cross-sectional view taken along a line I-I in FIG. 7C is equal to a cross-sectional view taken along a line I-I in FIG. 7A. That is, the cross-sectional view taken along a line I-I in FIG. 7C shows the cross section in FIG. 7B.

In FIG. 7B, a pitch P of lenses is set to 35 μm and a height of the lenses is set to 5 μm. To evaluate the moiré by changing the pitch P and the height H of the lenses, the large moiré reduction effect can be obtained by setting H/P to not less than 1/10 and the remarkable moiré reduction effect can be obtained by setting H/P to not less than 1/7. Further, to evaluate the moiré by changing θ1 in FIG. 7A, the moiré reduction effect can be obtained by setting θ1 to a value which satisfies 40 degrees≦θ1≦75 degrees and the remarkable moiré reduction effect can be obtained by setting θ1 to a value which satisfies 55 degrees≦θ1≦75degrees. Further, the optimum moiré reduction effect can be obtained by setting θ1 to 65 degrees. The same goes for θ2 in FIG. 7C. Although the example in which the relationship θ1=θ2 is established is shown in FIG. 7A, FIG. 7B and FIG. 7C, it is possible to acquire the advantageous effects of the present invention even when θ1 and θ2 differ from each other.

Figure 8A:
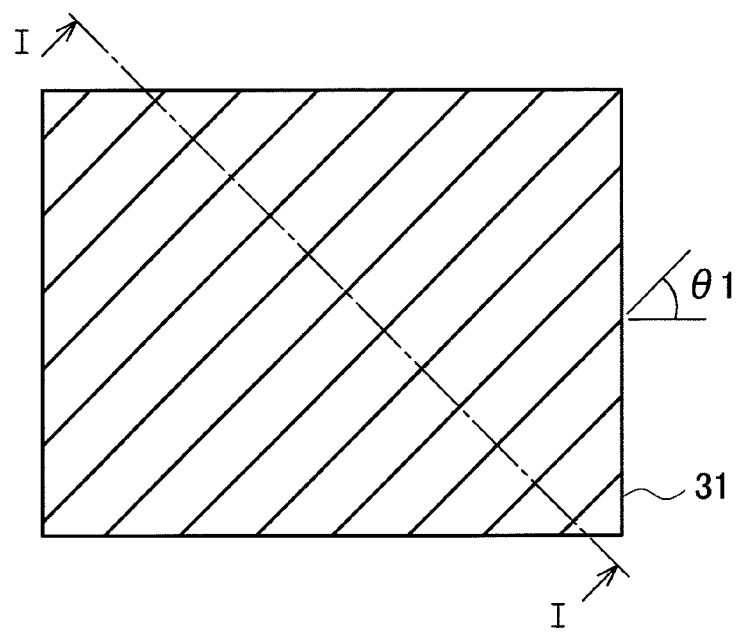
FIG. 8A is a plan view of a wave-sheet-shaped upper lens array.
Figure 8B:
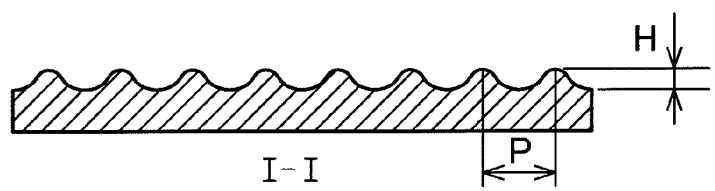
FIG. 8B is a cross-sectional view of the wave-sheet-shaped lens array.
Figure 8C:
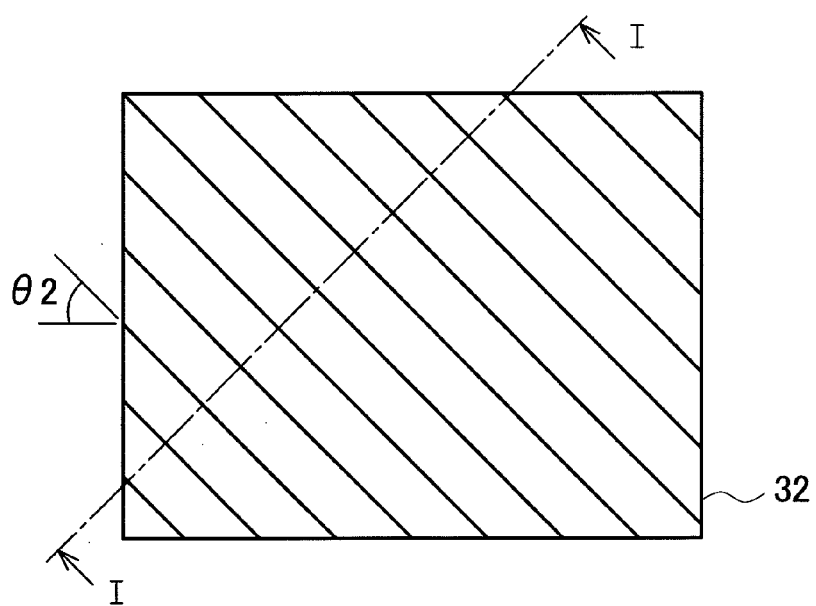
FIG. 8C is a plan view of the wave-sheet-shaped lower lens array.

FIG. 8A, FIG. 8B and FIG. 8C show another example of the lens array. FIG. 8A is a plan view of the upper lens array 31. A hatching in FIG. 8A indicates the direction of the lenticular lenses. An angle made by the direction of the lenticular lenses and a long side of the lens array is set to θ1. FIG. 8B is a cross-sectional view taken along a line I-I in FIG. 8A. Although a cross section of the lens array shown in FIG. 7B has a typical shape of a so-called lenticular lens, a cross section of the lens array shown in FIG. 8B has a shape close to a wave-sheet shape. The cross section shown in FIG. 8B is formed of a gentle curve as a whole and hence, the lens array can exhibit a higher moiré reduction effect. FIG. 8C is a plan view of the lower lens array 32. The angle θ2 of ridges of the lenses in FIG. 8C is arranged in line symmetry with the angle θ1 of ridges of the lenses in FIG. 8A with respect to a short axis of the lens array. The cross section taken along a line I-I in FIG. 8C is substantially equal to the cross section taken along a line I-I in FIG. 8A.

A lens pitch P and a lens height H shown in FIG. 8B are substantially equal to values in the case shown in FIG. 7B. That is, the pitch P of lenses is set to 35 μm and the height of the lenses is set to 5 μm. Further, to evaluate the moiré by changing the pitch P and the height H of the lenses, the large moiré reduction effect can be obtained by setting H/P to not less than 1/10 and the remarkable moiré reduction effect can be obtained by setting H/P to not less than 1/7. Further, to evaluate the moiré by changing θ1 in FIG. 8A, the moiré reduction effect can be obtained by setting θ1 to a value which satisfies 40 degrees≦θ1≦75 degrees and the remarkable moiré reduction effect can be obtained by setting θ1 to a value which satisfies 55 degrees≦θ1≦75 degrees. Further, the optimum moiré reduction effect can be obtained by setting θ1 to 65 degrees. The same goes for θ2 in FIG. 8C in the same manner as θ1 in FIG. 8A.

Figure 9A:
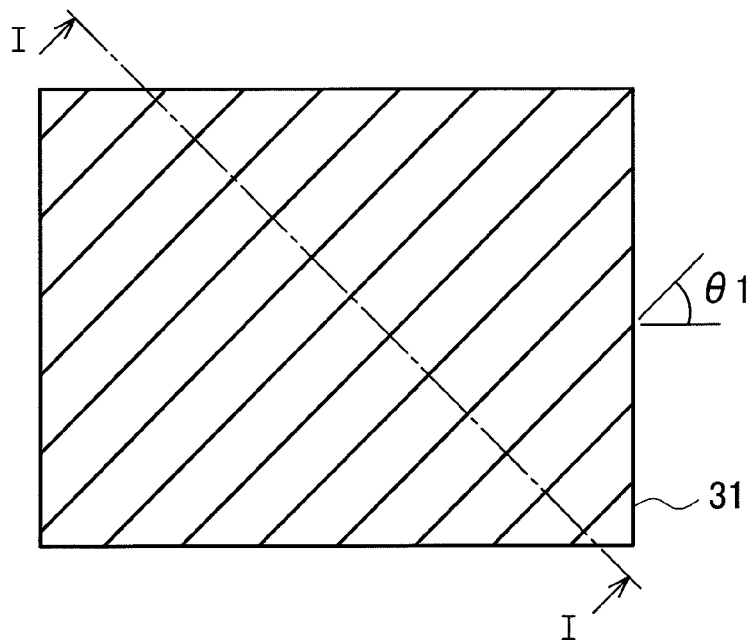
FIG. 9A is a plan view of a prism-sheet-shaped upper lens array.
Figure 9B:
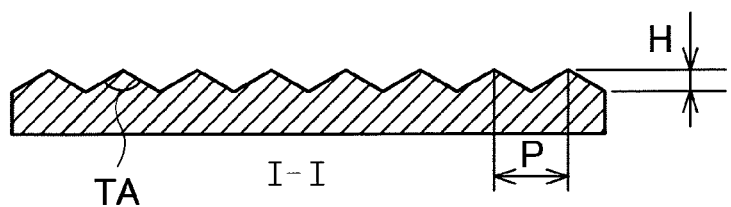
FIG. 9B is a cross-sectional view of the prism-sheet-shaped lens array.
Figure 9C:
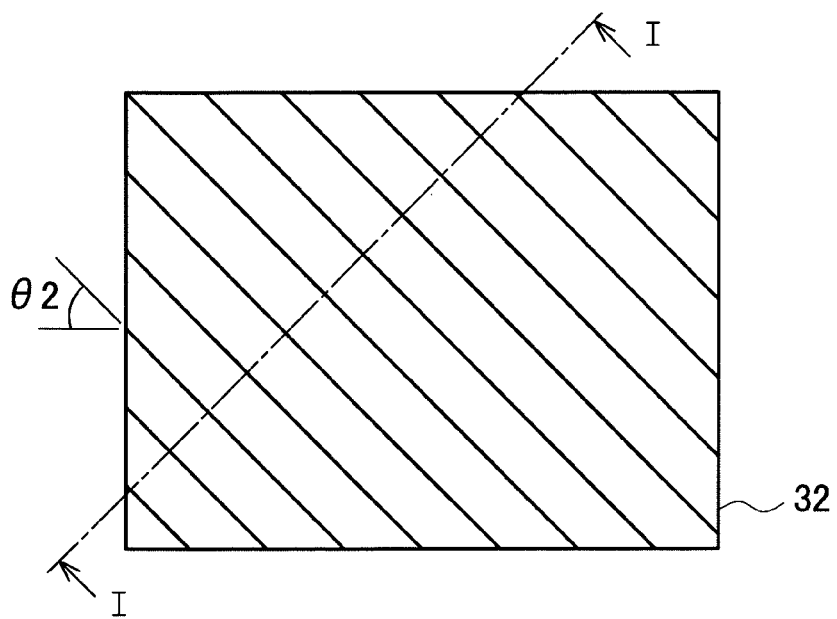
FIG. 9C is a plan view of the prism-sheet-shaped lower lens array.

FIG. 9A, FIG. 9B and FIG. 9C show another example of the lens array. FIG. 9A is a plan view of the upper lens array 31. A hatching in FIG. 9A indicates the direction of the lenticular lenses. An angle made by the direction of the lenticular lenses and a long side of the lens array is set to θ1. FIG. 9B is a cross-sectional view taken along a line I-I in FIG. 9A. A cross section of the upper lens array 31 shown in FIG. 9B is substantially equal to a cross section of a prism sheet. However, an apex angle TA of the prism is set larger than 90 degrees. The lens array shown in FIG. 9 has a shape substantially equal to a shape of the prism sheet being used in a backlight for many years and hence, the lens array is advantageous in view of a production cost. FIG. 9C is a plan view of the lower lens array 32. The angle θ2 of ridges of the lenses in FIG. 9C is arranged in line symmetry with the angle θ1 of ridges of the lenses in FIG. 9A with respect to a short axis of the lens array. The cross section taken along a line I-I in FIG. 9C is substantially equal to the cross section taken along a line I-I in FIG. 8A in the same manner as FIG. 9B.

A lens pitch P and a lens height H shown in FIG. 9B are substantially equal to values in the case shown in FIG. 7B. That is, the pitch P of lenses is set to 35 μm and the height of the lenses is set to 5 μm. That is, to evaluate the moiré by changing the pitch P and the height H of the lenses, the large moiré reduction effect can be obtained by setting H/P to not less than 1/10 and the remarkable moiré reduction effect can be obtained by setting H/P to not less than 1/7. In such a case, an apex angle TA of the lens array is set to a value remarkably larger than 90 degrees. Further, to evaluate the moiré by changing θ1 in FIG. 9A, the moiré reduction effect can be obtained by setting θ1 to a value which satisfies 40 degrees≦θ1≦75 degrees and the remarkable moiré reduction effect can be obtained by setting θ1 to a value which satisfies 55 degrees≦θ1≦75 degrees. Further, the optimum moiré reduction effect can be obtained by setting θ1 to 65 degrees. The same goes for θ2 in FIG. 9C in the same manner as θ1 in FIG. 9A.

Figure 10A:
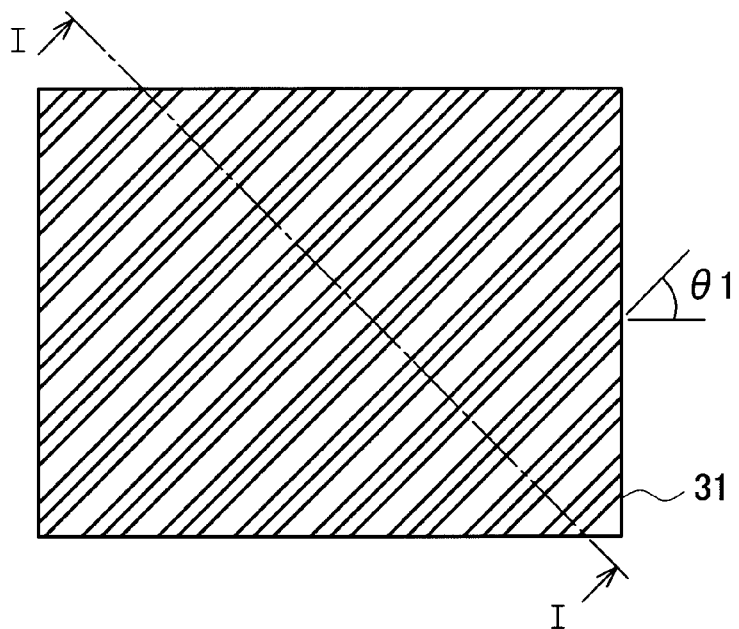
FIG. 10A is a plan view of an upper lens array.
Figure 10B:
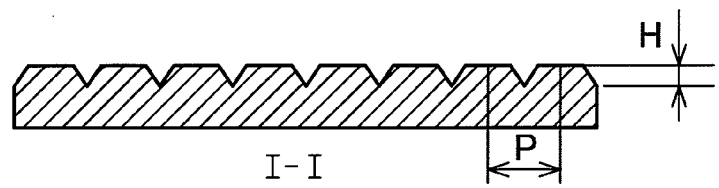
FIG. 10B is a cross-sectional view of the lens array.
Figure 10C:
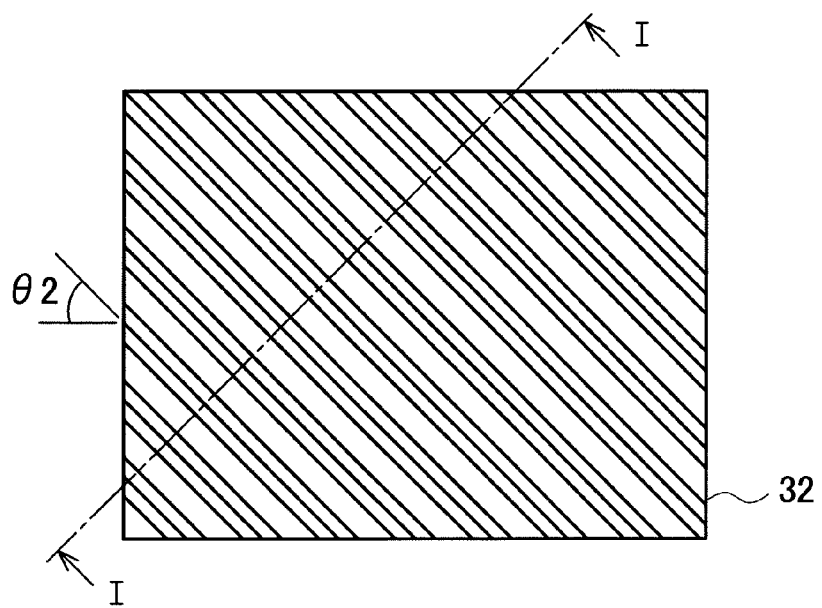
FIG. 10C is a plan view of the lower lens array.

FIG. 10A, FIG. 10B and FIG. 10C show another example of the lens array. FIG. 10A is a plan view of the upper lens array 31. A hatching in FIG. 10A indicates the direction of the lenticular lenses. An angle made by the direction of the lenticular lenses and a long side of the lens array is set to θ1. FIG. 10B is a cross-sectional view taken along a line I-I in FIG. 10A. In the lens array shown in FIG. 10A, a cross-sectional view of each lens has a trapezoidal shape shown in FIG. 10B. By forming the lens in a trapezoidal shape, compared to the above-mentioned examples or the like, the optical interference of the lens array with other optical member can be reduced and, at the same time, the lens array can acquire the optical property close to optical property of a usual lenticular lens having an arcuate cross section. Further, by forming the cross section of the lens in a trapezoidal shape, a mechanical strength of the lens array can be increased. Further, by forming the cross-section of the lens in a trapezoidal shape, the manufacture of a mold for forming the lens array is facilitated thus suppressing a manufacturing cost of the lens array.

FIG. 10C is a plan view of the lower lens array 32. The angle θ2 of ridges of the lenses in FIG. 10C is arranged in line symmetry with the angle θ1 of ridges of the lenses in FIG. 10A with respect to a short axis of the lens array. The cross section taken along a line I-I in FIG. 10C is substantially equal to the cross section taken along a line I-I in FIG. 10A in the same manner as FIG. 10A.

A lens pitch P and a lens height H shown in FIG. 10B are substantially equal to values in the case shown in FIG. 7B. That is, the pitch P of lenses is set to 35 μm and the height of the lenses is set to 5 μm. Further, to evaluate the moiré by changing the pitch P and the height H of the lenses, the large moiré reduction effect can be obtained by setting H/P to not less than 1/10 and the remarkable moiré reduction effect can be obtained by setting H/P to not less than 1/7. Further, to evaluate the moiré by changing θ1 in FIG. 10A, the moiré reduction effect can be obtained by setting θ1 to a value which satisfies 40 degrees≦θ1≦75 degrees and the remarkable moiré reduction effect can be obtained by setting θ1 to a value which satisfies 55 degrees≦θ1≦75 degrees. Further, the optimum moiré reduction effect can be obtained by setting θ1 to 65 degrees. The same goes for θ2 in FIG. 10C in the same manner as θ1 in FIG. 10A.

Figure 11A:
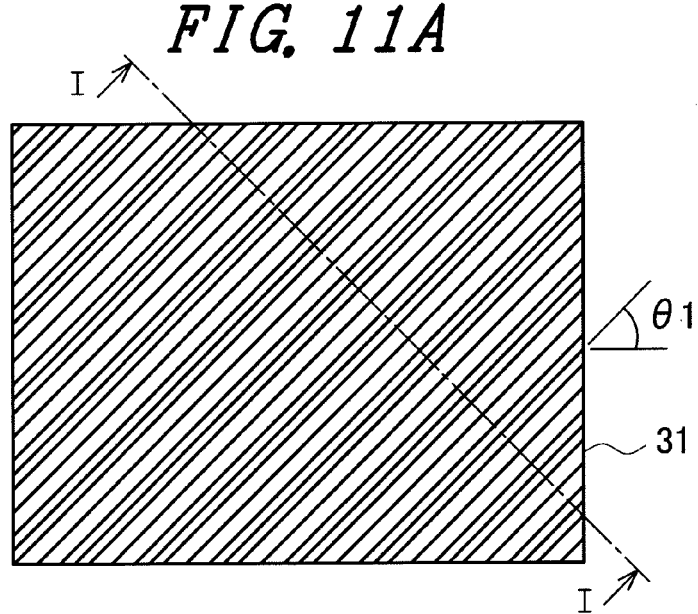
FIG. 11A is a plan view of an upper lens array.
Figure 11B:
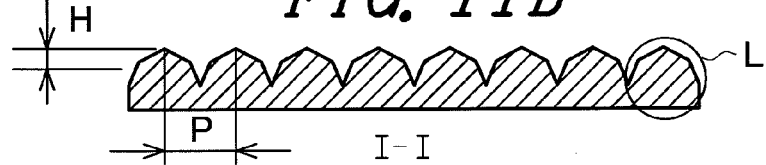
FIG. 11B is a cross-sectional view of the lens array.

FIG. 11A, FIG. 11B, FIG. 11C and FIG. 11D show another example of the lens array. FIG. 11A is a plan view of the upper lens array 31. A hatching in FIG. 11A indicates the direction of the lenticular lenses. An angle made by the direction of the lenticular lenses and a long side of the lens array is set to θ1. FIG. 11B is a cross-sectional view taken along a line I-I in FIG. 11A. In the lens array shown in FIG. 11A, FIG. 11B, FIG. 11C and FIG. 11D, a cross section of each lens has a pentagonal shape having apexes at distal ends thereof as shown in FIG. 1C. In a manufacturing method of a lens array in general, a mold is manufactured firstly, and a resin or the like is poured into the mold. The mold is often formed by mechanical machining using a cutting tool. In cutting the mold using the cutting tool, it is more preferable for the lenses to have a polygonal lens cross section instead of a circular lens cross section.

Figure 11C:
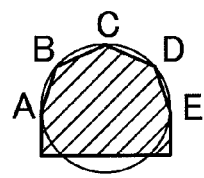
FIG. 11C is a lens cross-sectional view, and 11D is a plan view of the lower lens array.

While the lenticular lens in general has a circular cross section, there may be a case that the circular cross section makes the mechanical machining difficult. In this case, as shown in FIG. 11C, by forming the lens into a trapezoidal shape and allowing respective apexes to inscribe a particular circle, the lens array can acquire properties substantially equal to properties of a usual lenticular lens. According to the example shown in FIG. 11A to FIG. 11D, the lens array can acquire properties substantially equal to properties of a usual lenticular lens while facilitating the manufacture of the lens array and suppressing a manufacturing cost of the lens array.

Figure 11D:
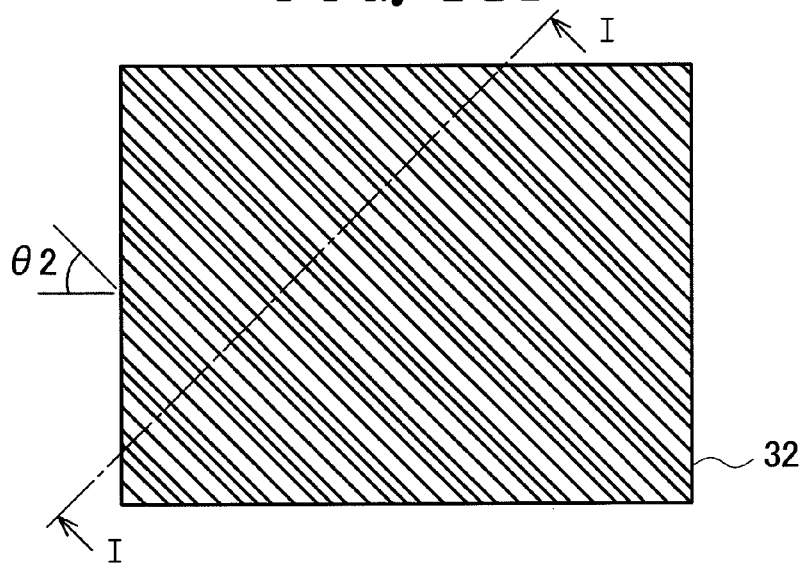

FIG. 11D is a plan view of the lower lens array 32. The angle θ2 of ridges of the lenses in FIG. 11D is arranged in line symmetry with the angle θ1 of ridges of the lenses in FIG. 11A with respect to a short axis of the lens array. The cross section taken along a line I-I in FIG. 11D is substantially equal to the cross section taken along a line I-I in FIG. 11A in the same manner as FIG. 11B.

A lens pitch P and a lens height H shown in FIG. 11B are substantially equal to values in the case shown in FIG. 7B. That is, the pitch P of lenses is set to 35 μm and the height of the lenses is set to 5 μm. Further, to evaluate the moiré by changing the pitch P and the height H of the lenses, the large moiré reduction effect can be obtained by setting H/P to not less than 1/10 and the remarkable moiré reduction effect can be obtained by setting H/P to not less than 1/7. Further, to evaluate the moiré by changing θ1 in FIG. 11A, the moiré reduction effect can be obtained by setting θ1 to a value which satisfies 40 degrees≦θ1≦75 degrees and the remarkable moiré reduction effect can be obtained by setting θ1 to a value which satisfies 55 degrees≦θ1≦75 degrees. Further, the optimum moiré reduction effect can be obtained by setting θ1 to 65 degrees. The same goes for θ2 in FIG. 11C in the same manner as θ1 in FIG. 11A.

In the above-mentioned example, the upper lens array 31 and the lower lens array 32 have the same specification in all aspects except for that the upper lens array 31 and the lower lens array 32 have ridges thereof arranged in symmetry with respect to the short axis of the lens array. However, the present invention is not limited to such cases and the advantageous effects of the present invention can be acquired even when the upper lens array 31 and the lower lens array 32 differ from each other in lens pitch, lens shape, angle and the like.

Further, in the above-mentioned examples, a side of the lens array on which the lenses are formed is directed upwardly. However, even when all lenses may be directed downwardly or one lens may be directed downwardly, it is possible to acquire the advantageous effects of the present invention.

Embodiment 2

Figure 12:
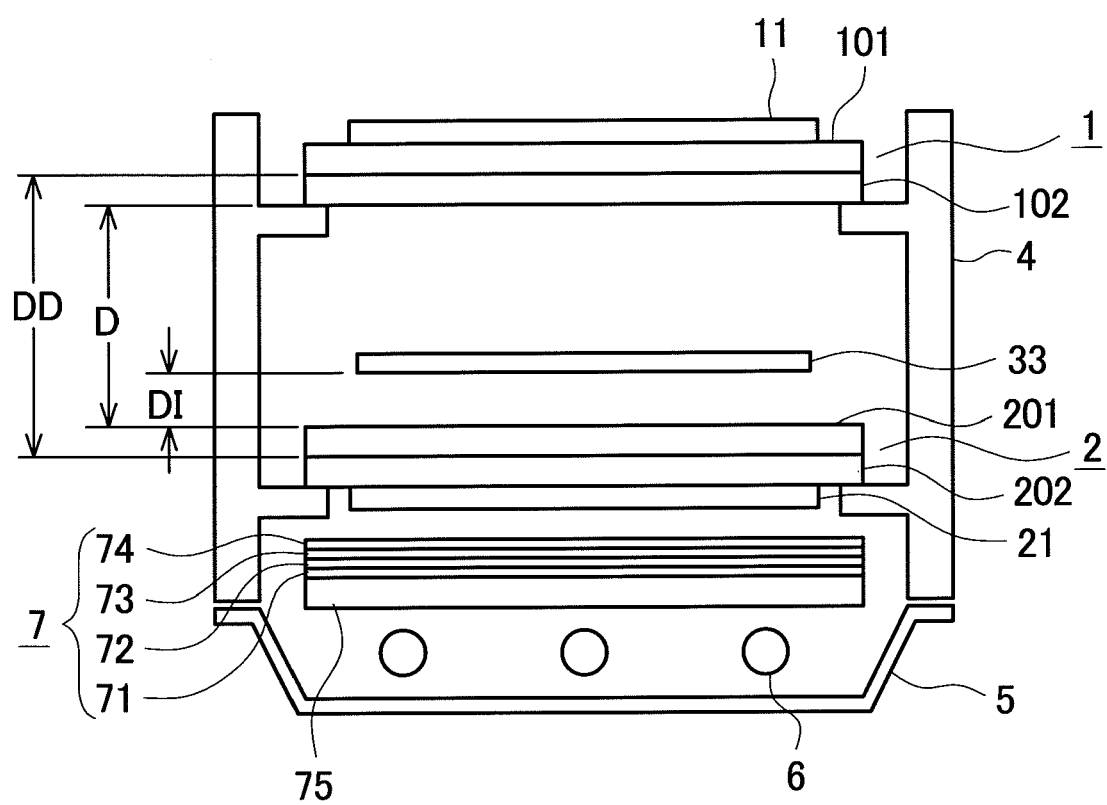
FIG. 12 is a schematic cross-sectional view of a three-dimensional display device according to an embodiment 2 of the present invention.

FIG. 12 is a schematic cross-sectional view showing a second embodiment of a three-dimensional display device according to the present invention. The constitution which makes this embodiment different from the embodiment 1 lies in that the lens arrays are formed on one lens sheet. This embodiment is characterized by the use of a double lens array 33 which forms a lens on both upper and lower surfaces of the lens sheet. The lens sheet of this embodiment also has a thickness of approximately 0.3 mm or 0.5 mm. By adopting such a constitution, the number of parts can be reduced and, at the same time, the relative setting difference between two lens arrays can be eliminated.

Figure 13A:
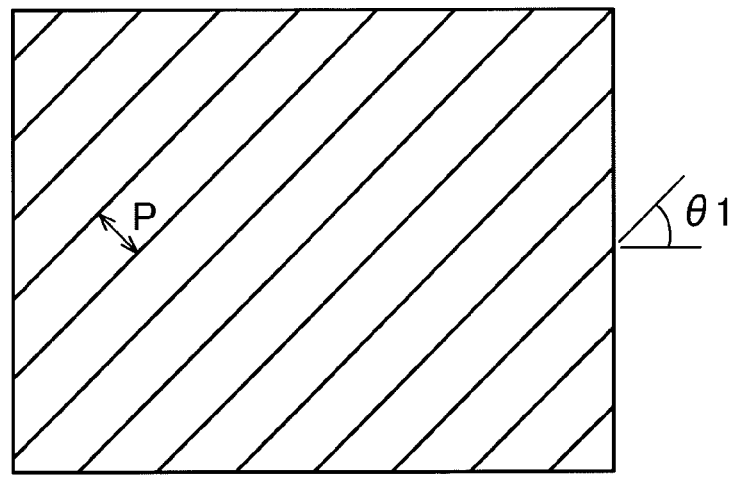
FIG. 13A is a plan view of a double lens array.
Figure 13B:
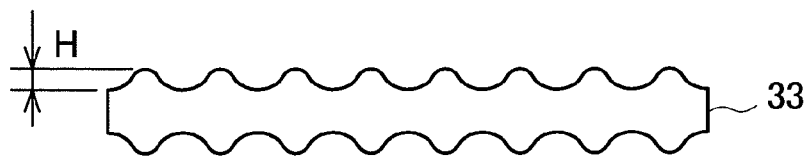
FIG. 13B is a side view of the double lens array.
Figure 13C:
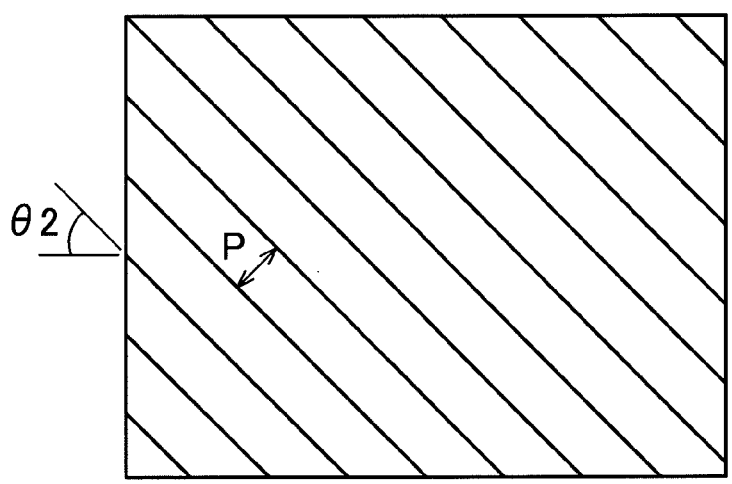
FIG. 13C is a back view of the double lens array.

FIG. 13A, FIG. 13B and FIG. 13C are schematic views of the double lens array 33 used in the embodiment 2. FIG. 13A is a plan view of the double lens array 33. A hatching shown in FIG. 13A indicates the direction of a lenticular lens and an angle made by the direction of the lenticular lens and a long side of the lens array is set to θ1. FIG. 13C is a back view of the double lens array 33. An angle θ2 of ridges of lenses in FIG. 13C is arranged in line symmetry with the angle θ1 of the ridges of lenses in FIG. 13A with respect to a short axis of the lens array.

FIG. 13B is a side view of the double lens array 33. As shown in FIG. 13B, the lens array is formed on a front surface and a back surface of the double lens array 33. The lens array shown in FIG. 13A to FIG. 13C is formed of a wave sheet. Both of pitches and heights of the lens array on the front surface and the lens array on the back surface shown in FIG. 13A to FIG. 13C are substantially equal to pitches and heights of the lens array of the embodiment 1. That is, the pitches P of lenses are set to 35 μm and the heights of the lenses are set to 5 μm. Further, to evaluate the moiré by changing the pitch P and the height H of the lenses, the large moiré reduction effect can be obtained by setting H/P to not less than 1/10 and the remarkable moiré reduction effect can be obtained by setting H/P to not less than 1/7. Further, to evaluate the moiré by changing θ1 in FIG. 13A, the moiré reduction effect can be obtained by setting θ1 to a value which satisfies 40 degrees≦θ1≦75 degrees and the remarkable moiré reduction effect can be obtained by setting θ1 to a value which satisfies 55 degrees≦θ1≦75 degrees. Further, the optimum moiré reduction effect can be obtained by setting θ1 to 65 degrees. The same goes for θ2 in FIG. 13C in the same manner as θ1 in FIG. 13A.

In the above-mentioned embodiment, the lens array on the front surface and the lens array on the back surface of the double lens array 33 have the same specification in all aspects except for that an angle θ1 or an angle θ2 of the ridges of each lens array is arranged in symmetry with respect to a short axis of the lens array. However, the present invention is not limited to such a case and the advantageous effects of the present invention can be acquired even when the lens array on the front surface and the lens array on the back surface differ from each other in lens pitch, lens shape, angle and the like. Further, in the embodiment 2, the wave-sheet cross section is used as the cross-sectional shape of the lens array. However, the cross section of the lens array is not limited to such a shape and the lens arrays having the various cross-sectional shapes explained in conjunction with the embodiment 1 may be used.

Embodiment 3

Figure 14:
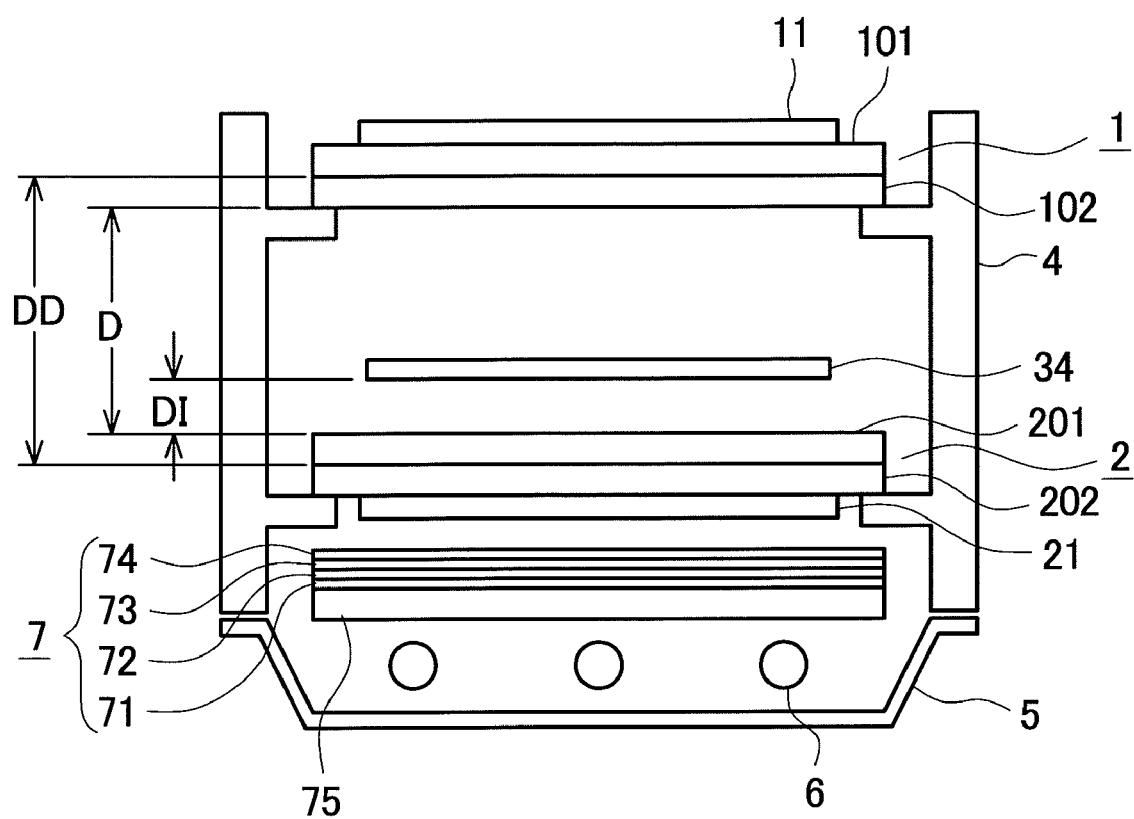
FIG. 14 is a schematic cross-sectional view of a three-dimensional display device according to an embodiment 3 of the present invention.

FIG. 14 is a schematic cross-sectional view showing a three-dimensional display device of the third embodiment of the present invention. Also in this embodiment, only one lens array sheet is used. The constitution which makes this embodiment different from the embodiment 2 lies in that a lens array is formed on only one surface (for example, a front surface) of the lens array sheet. This embodiment is characterized by the use of a two-directional lens 34 for acquiring a moiré reduction effect substantially equal to the moiré reduction effects of the embodiments 1 and 2. With respect to the two-directional lens 34 of this embodiment, it is sufficient to form the lens array only on one surface of one lens sheet and hence, this embodiment 3 is largely advantageous in view of cost compared to the embodiment 1 and the embodiment 2.

Figure 15A:
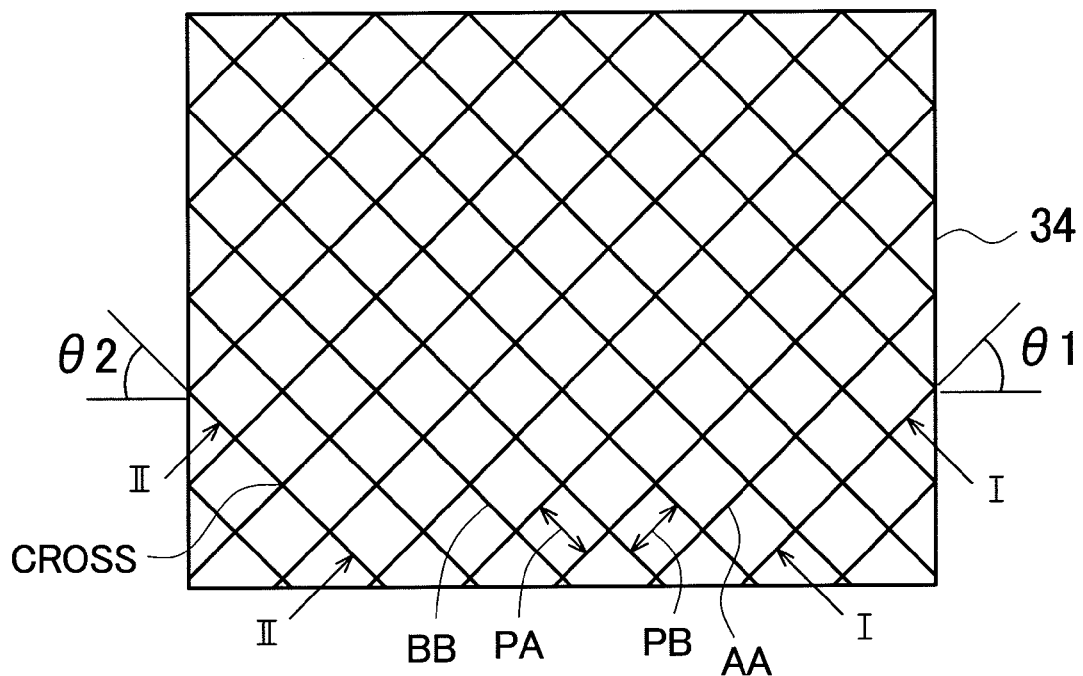
FIG. 15A is a plan view of a two-directional lens array of the embodiment 3.
Figure 15B:
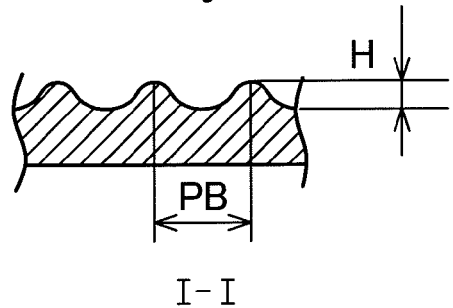
FIG. 15B is a cross-sectional view of the two-directional lens array along the first direction, and 15C is a cross-sectional view of the two-directional lens array along the second direction.
Figure 15C:
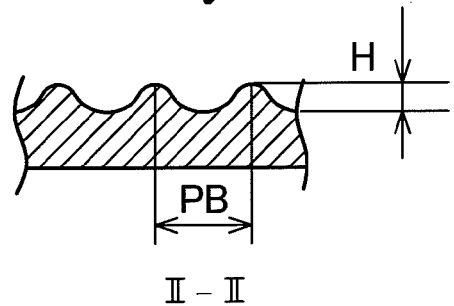

FIG. 15A, FIG. 15B and FIG. 15C show an example of the two-directional lens array 34 used in this embodiment. FIG. 15A is a plan view of the two-directional lens array 34. The two-directional lens array 34 is configured such that microlenses are arranged in two directions with periodicity. Since the microlenses are arranged in two directions, this embodiment can acquire advantageous effects substantially equal to the three-dimensional display device which forms two lenticular lenses only on one surface of the lens sheet. In FIG. 15A, hatchings extending in two directions indicate the arrangement directions of microlenses. The hatching AA indicates one direction (first direction) of the arrangement of microlenses, and the hatching BB indicates another direction (second direction) of the arrangement of microlenses. Peaks of microlenses are formed at intersecting points CROSS of the hatchings. An angle made by the hatching AA and a long side of the two-directional lens array 34 is set to θ1, and an angle made by the hatching BB and the long side of the two-directional lens array 34 is set to θ2. Further, a pitch of the hatching AA is PB and a pitch of the hatching BB is PA.

FIG. 15B is a cross-sectional view taken along a line I-I in FIG. 15A. FIG. 15C is a cross-sectional view taken along a line II-II in FIG. 15A. As shown in FIG. 15B and FIG. 15C, a cross-sectional shape of each microlens is formed in a wave shape. The pitch PA and the pitch PB of the microlenses are set to the same value, that is, 35 μm and the heights of the lenses are set to 5 μm. Further, to evaluate the moiré by changing the pitch P and the height H of the lenses, in the same manner as the embodiment 1 and the embodiment 2, the large moiré reduction effect can be obtained by setting H/P to not less than 1/10 and the remarkable moiré reduction effect can be obtained by setting H/P to not less than 1/7. Further, to evaluate the moiré by changing θ1 in FIG. 15A, the moiré reduction effect can be obtained by setting θ1 to a value which satisfies 40 degrees≦θ1≦75 degrees and the remarkable moiré reduction effect can be obtained by setting θ1 to a value which satisfies 55 degrees≦θ1≦75 degrees. Further, the optimum moiré reduction effect can be obtained by setting θ1 to 65 degrees. The same goes for θ2 in FIG. 15A in the same manner as θ1 in FIG. 15A.

In the above-mentioned embodiment, the pitch PA and the pitch PB of the micro lens array are set equal to each other. However, the advantageous effects of the present invention can be also obtained even when the pitch PA and the pitch PB of the micro lens array are different from each other. Further, in the above-mentioned embodiment, the angle θ1 and the angle θ2 of the micro lens array are set equal to each other. However, the advantageous effects of the present invention can be also obtained even when the angle θ1 and the angle θ2 of the micro lens array are different from each other. Further, a cross section of the micro lens is not limited to the shape shown in FIG. 15B or FIG. 15C and may take various cross-sectional shapes including a portion of a spherical shape or the like.

In the above-mentioned embodiments, the explanation has been made with respect to the case in which the light source used as a backlight is arranged directly below the liquid crystal display panel, that is, the so-called direct-type backlight. However, the present invention is applicable not only to the direct-type backlight but also to the side-type backlight which arranges a light source on a side of the backlight. In the side-type backlight, in addition to the optical sheet group 7 shown in FIG. 1, a light guide plate which guides light in the direction toward a main surface of the liquid crystal display panel from a side thereof becomes necessary.

What is claimed is:

1. A display device comprising a first liquid crystal display panel, a second liquid crystal display panel arranged behind the first liquid crystal display panel, and a backlight arranged behind the second liquid crystal display panel, wherein between the first liquid crystal display panel and the second liquid crystal display panel, a first lens array for focusing light more strongly in a direction orthogonal to a first direction than the first direction, and a second lens array for focusing light more strongly in a direction orthogonal to a second direction different from the first direction are arranged.

2. A display device according to claim 1, wherein the first lens array is a lens array which does not focus light in the first direction, and the second lens array is a lens array which does not focus light in the second direction.

3. A display device according to claim 1, wherein the first direction and the second direction make angles with respect to a long side of the first liquid crystal display panel or a long side of the second liquid crystal display panel.

4. A display device according to claim 1, wherein the first direction and the second direction make angles ranging from 40 degrees to 75 degrees with respect to a long side of the first liquid crystal display panel or a long side of the second liquid crystal display panel.

5. A display device according to claim 1, wherein the first direction and the second direction make angles ranging from 55 degrees to 75 degrees with respect to a long side of the first liquid crystal display panel or a long side of the second liquid crystal display panel.

6. A display device according to claim 1, wherein the first lens array or the second lens array is arranged to be in contact with the second liquid crystal display panel.

7. A display device according to claim 1, wherein the first lens array or the second lens array is formed of lenticular lenses.

8. A display device according to claim 7, wherein a cross section of the lenticular lens has a valley formed between the respective lenses formed in a curved shape.

9. A display device according to claim 1, wherein a lens cross section of the first lens array or the second lens array is formed in a corrugated shape.

10. A display device according to claim 1, wherein a lens cross section of the first lens array or the second lens array is formed in a triangular shape with a peak angle set to a value larger than 90 degrees.

11. A display device according to claim 1, wherein a lens cross section of the first lens array or the second lens array is formed in a trapezoidal shape.

12. A display device according to claim 1, wherein a lens cross section of the first lens array or the second lens array is formed in a pentagonal shape with distal ends thereof formed into peaks.

13. A display device according to claim 1, wherein the relationship between a pitch P and a height H of lenses of the first lens array or the second lens array is set to satisfy H/P≦1/10.

14. A display device according to claim 1, wherein the relationship between a pitch P and a height H of lenses of the first lens array or the second lens array is set to satisfy H/P≦1/7.

15. A display device comprising a first liquid crystal display panel, a second liquid crystal display panel arranged behind the first liquid crystal display panel, and a backlight arranged behind the second liquid crystal display panel, wherein between the first liquid crystal display panel and the second liquid crystal display panel, a first lens array sheet for focusing light more strongly in a direction orthogonal to a first direction than the first direction, and a second lens array sheet for focusing light more strongly in a direction orthogonal to a second direction different from the first direction are arranged.

16. A display device comprising a first liquid crystal display panel, a second liquid crystal display panel arranged behind the first liquid crystal display, and a backlight arranged behind the second liquid crystal display panel, wherein a lens array sheet is arranged between the first liquid crystal display panel and the second liquid crystal display panel, a first lens array for focusing light more strongly in a direction orthogonal to a first direction than the first direction is formed on a first surface of the lens array sheet, and a second lens array for focusing light more strongly in a direction orthogonal to a second direction different from the first direction is formed on a second surface of the lens array sheet.

17. A display device comprising a first liquid crystal display panel, a second liquid crystal display panel arranged behind the first liquid crystal display panel, and a backlight arranged behind the second liquid crystal display panel, wherein a lens array sheet is arranged between the first liquid crystal display panel and the second liquid crystal display panel, and a micro lens array having periodicity in a first direction and a second direction different from the first direction is formed on a surface of the lens array sheet.

18. A display device according to claim 17, wherein the other surface of the lens array sheet is a planar surface.

19. A display device according to claim 17, wherein a pitch in the first direction and a pitch in the second direction of the micro lens array are equal to each other.

20. A display device according to claim 17, wherein the first direction and the second direction are arranged in line symmetry with respect to a short axis of the lens sheet.

* * * * *